United States Patent [19]
Miller

[11] 3,859,300

[45] Jan. 7, 1975

[54] NITROGEN- AND PHOSPHORUS-CONTAINING COMPOSITIONS

[75] Inventor: Clark Ober Miller, Willoughby Hill, Ohio

[73] Assignee: The Lubrizol Corporation, Wickliffe, Ohio

[22] Filed: Feb. 14, 1972

[21] Appl. No.: 226,316

Related U.S. Application Data

[60] Division of Ser. No. 125,323, March 17, 1971, Pat. No. 3,687,645, which is a continuation-in-part of Ser. No. 757,781, Sept. 5, 1968, abandoned.

[52] U.S. Cl. ....... 260/309.6, 260/561 N, 260/561 R, 260/566 R
[51] Int. Cl. ............................................ C07d 49/34
[58] Field of Search ...................... 260/309.6; 44/63

[56] References Cited
UNITED STATES PATENTS

| | | |
|---|---|---|
| 3,427,141 | 2/1969 | Miller et al. ............................ 44/63 |
| 3,440,247 | 4/1969 | Dorer ............................... 260/309.6 |

*Primary Examiner*—Henry R. Jiles
*Assistant Examiner*—S. D. Winters
*Attorney, Agent, or Firm*—J. Walter Adams, Jr.; William H. Pittman

[57] ABSTRACT

Compositions which are useful as gasoline additives to decrease carburetor icing and water susceptibility and to provide detergency to decrease deposits in the carburetor throttle area are prepared by reacting, at a temperature below about 100°C., (A) a phosphoric acid mono- or diester; (B) an alkylene polyamine; and (C) the reaction product of an aliphatic carboxylic acid having at least about 12 carbon atoms, or a lower alkyl ester thereof, with an alkylene polyamine and an aliphatic epoxide having 2–4 carbon atoms or with an N-hydroxyalkyl-substituted alkylene polyamine.

17 Claims, No Drawings

NITROGEN- AND PHOSPHORUS-CONTAINING COMPOSITIONS

This application is a division of copending application Ser. No. 125,323, filed Mar. 17, 1971, now U.S. Pat. No. 3,687,645, which in turn is a continuation-in-part of application Ser. No. 757,781, filed Sept. 5, 1968, now abandoned.

This invention relates to novel compositions of matter suitable for use as fuel additives, and more particularly to compositions obtained by reacting, at a temperature below about 100°C., A. at least one compound having the formula

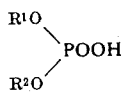

wherein $R^1$ is a hydrocarbon or substituted hydrocarbon radical having 8–18 carbon atoms and $R^2$ is hydrogen or a hydrocarbon or substituted hydrocarbon radical having 8–18 carbon atoms;

B. about 0.5–0.9 equivalent, per equivalent of reagent A, of at least one polyamine having the formula

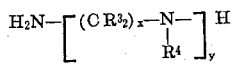

wherein each of $R^3$ and $R^4$ is hydrogen or an alkyl, cycloalkyl or substituted alkyl or cycloalkyl radical, $x$ is an integer from 2 to 10, and $y$ is an integer from 1 to 10; and C. about 0.05–2.0 equivalents, per equivalent of reagent A, of the reaction product of (I) at least one aliphatic carboxylic acid having at least about 12 carbon atoms, or a lower alkyl ester thereof, with (II) at least one alkylene polyamine and an aliphatic epoxide having about 2–4 carbon atoms, the amount of said epoxide being about 1–20% by weight of the combination of said carboxylic acid or ester and said alkylene polyamine, or with (III) at least one N-hydroxyalkyl-substituted alkylene polyamine;

about 0.55–2.5 equivalents of basic nitrogen being present in reagents B and C per equivalent of reagent A.

When internal combustion engines are operated on a gasoline fuel having the desired volatility characteristics for cold weather driving, stalling often occurs during the warm-up period, particularly under cool, humid atmospheric conditions. It has been generally recognized that the cause of repeated engine stalling in cool, humid weather is the formation of ice on the throttle plate and the carburetor valve near it. Most of the water which forms this ice comes from the air that enters the carburetor. The gasoline which evaporates in the carburetor has sufficient refrigerating effect to condense and freeze the moisture in the air and cause ice particles to build up on the throttle plate and in the carburetor valve. Then, as the engine is idled, the throttle plate closes and the ice chokes off the normal small flow of air through the small clearance between the throttle plate and the carburetor wall, causing the engine to stall.

The stalling of automobile engines in cold weather may also result from the presence of water in the gasoline itself. This water may be introduced during blending operations, during storage by condensation from the atmosphere, or during transportation to the consumer. During cold weather, this water will very often freeze and block the fuel line or plug filters, thus preventing passage of the gasoline to the engine.

Heretofore, these problems have been at least partially overcome by the addition to the gasoline of alcohols, glycols, or similar materials which lower the freezing point of water. However, the effective amount of such additives is in the order of 1 to 3% by volume. Such large concentrations are expensive and frequently affect the chemical and physical properties of the gasoline. Moreover, they sometimes promote the formation of water-gasoline emulsions which may intensify the icing problem.

In U.S. Pat. No. 3,427,141 there is disclosed an anti-icing additive for fuels which also has carburetor detergent properties. It is still of interest, however, to develop additives which combine these properties with decreased water susceptibility.

A principal object of the present invention, therefore, is to provide new compositions suitable for use as fuel additives.

Another object is to provide fuel additives which suppress the formation of ice and water emulsions, and which act as carburetor detergents.

Another object is to provide a fuel composition inhibited against ice formation.

A further object is to provide an improved fuel composition which is designed to reduce or eliminate carburetor icing.

Another object is to provide a motor fuel adapted to prevent stalling during engine warm-up in cool, humid weather.

Still another object is to provide an improved gasoline fuel composition which contains a minor amount of a de-icing additive.

Other objects will in part be obvious and will in part appear hereinafter.

The phosphoric acid which is useful as reagent A in the preparation of the compositions of this invention is at least one partially esterified orthophosphoric acid having the formula

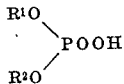

wherein $R^1$ and $R^2$ are as previously defined.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric form (e.g., butyl), all such forms are included.

| | |
|---|---|
| Methyl | Phenyl |
| Ethyl | Tolyl |
| Propyl | Xylyl |

-Continued

| Butyl | Benzyl |
| Hexyl | Cyclohexyl |
| Octyl | Cyclopentyl |
| Decyl | Methylcyclopentyl |
| Vinyl | Cyclopentadienyl |
| Allyl | Vinylphenyl |
| Ethynyl | Isopropenylphenyl |
| Propargyl | Cinnamyl |
| | Naphthyl |

-C$_6$H$_3$(C$_2$H$_5$)$_2$
-C$_6$H$_4$(CH$_2$)$_{11}$CH$_3$

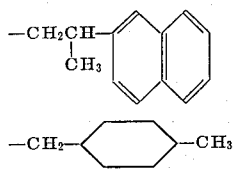

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Hydroxy
Ether (especially lower alkoxy)
Amino
Nitro
Cyano
Thioether
Sulfoxy
Sulfone In general, no more than about three such substituent groups will be present for each 10 carbon atoms in the radical.

As already mentioned, R$^1$ is a hydrocarbon or substituted hydrocarbon radical containing 8–18 carbon atoms, and R$^2$ may be a similar hydrocarbon radical or may be hydrogen. These hydrocarbon radicals are usually aliphatic radicals and preferably alkyl radicals. Most often, R$^1$ is a primary alkyl group, especially a branched primary alkyl group, and R$^2$ is hydrogen or is identical with R$^1$. Thus, reagent A may be a monoester or a diester of orthophosphoric acid, or a mixture of mono- and diesters. It is most conveniently prepared by the reaction of phosphorus pentoxide with 2–4 moles of a hydroxy compound (e.g., an alcohol or phenol) having 8–18 carbon atoms. Suitable hydroxy compounds include commercially available alcohols derived from coconut kernel oils. One such commercially available fraction consists mainly of n-octyl and n-decyl alcohols. Another consists largely of n-dodecyl alcohol but contains other alcohols having 10–18 carbon atoms. Also useful are mixtures of branched chain primary alcohols such as those produced by the well known "Oxo" process. Examples of such alcohols include the "Oxo" octyl, decyl, tridecyl and hexadecyl alcohols, all of which are mixtures consisting predominantly of branched chain primary alcohols obtained respectively from propene-butene dimer, tripropene, tetrapropene and pentapropene.

For reasons of convenience and economy, it is usually convenient to react about 3 moles of the hydroxy compound with 1 mole of phosphorus pentoxide. The product is then a mixture of mono- and diesters of orthophosphoric acid, and the reaction leading to its formation may be illustrated by the following equation:

$$3ROH + P_2O_5 \rightarrow (RO)_2POOH + ROPO(OH)_2.$$

The following examples illustrate the preparation of compositions useful as reagent A. All parts are by weight.

EXAMPLE 1

Phosphorus pentoxide (1,130 parts) is added slowly, over 5.2 hours, to tridecyl alcohol (4,775 parts) at 25°–51°C. The mole ratio of alcohol to P$_2$O$_5$ is 3:1. The mixture is heated at 60°–62°C. for 3 hours. The resulting tridecyl ester of phosphoric acid is filtered and is found to have a phosphorus content of 8.5% and an acid number of 213 at pH 4.

EXAMPLE 2

Phosphorus pentoxide (1,420 parts) is added to decyl alcohol (4,740 parts) at 16°–29°C. with cooling in an ice bath over a 3-hour period. The mole ratio of alcohol to phosphorus pentoxide is 3:1. The reaction mixture is heated at 60°–65°C. for 1.5 hours and is then filtered. The resulting decyl ester of phosphoric acid has a phosphorus content of 9.9% and an acid number of 222 at pH 4.

EXAMPLE 3

Phosphorus pentoxide (2,928 parts) is added during a 5-hour period to 4-methyl-2-pentanol (6,316 parts) at 12°–28°C. The mole ratio of alcohol to phosphorus pentoxide is 3:1. The reaction is exothermic and requires external cooling. The reaction mixture is heated at 55°–58°C. for 2 hours and the resulting product is filtered. The product is a 4-methyl-2-pentyl ester of phosphoric acid, and has a phosphorus content of 13.7% and an acid number of 278.

EXAMPLE 4

Phosphorus pentoxide (1,876 parts) is added over 1 hour to heptylphenol (1,848 parts) at 42°–53°C. The mole ratio of phenol to phosphorus pentoxide is 3:1. The reaction is exothermic, requiring external cooling during the addition of phosphorus pentoxide. The reaction mixture is heated at 62°–98°C. for 5 hours and is then filtered. The resulting heptylphenyl ester of phosphoric acid has a phosphorus content of 8.1% and an acid number of 208.

EXAMPLE 5

Phosphorus pentoxide (432 parts) is added over 40 minutes to dodecylphenol (2,539 parts) at 23°–26°C. The mole ratio of phenol to phosphorus pentoxide is 3:1. The reaction is exothermic. The mixture is heated from 26° to 110°C. over 1.75 hours, held an additional 1.75 hours at 102°–110°C., and filtered. The resulting dodecylphenyl ester of phosphoric acid has a phosphorus content of 6.25% and an acid number of 158.

EXAMPLE 6

Phosphorus pentoxide (2,268 parts) is added over 3.5 hours at 18°–35°C. to 2-ethylhexyl alcohol (6,244 parts). The mole ratio of alcohol to phosphorus pentoxide is 3:1. The reaction is exothermic, requiring cooling. The mixture is heated at 60°C. for 1.5 hours and is then filtered. The resulting 2-ethylhexyl ester of phosphoric acid has a phosphorus content of 11.4% and an acid number of 254.

EXAMPLE 7

Phosphorus pentoxide (962 parts) is added over 2 hours to n-butyl alcohol (1,500 parts) at 20°–32°C. The mole ratio of alcohol to phosphorus pentoxide is 3:1. The reaction is exothermic, requiring external cooling during the addition of phosphorus pentoxide. The mixture is heated at 60°C. for an additional hour and is then filtered. The resulting butyl ester of phosphoric acid has a phosphorus content of 16.6% and an acid number of 420.

Reagent B, as previously mentioned, is a polyamine of the formula

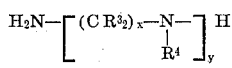

wherein each of $R^3$ and $R^4$ is hydrogen or an alkyl, cycloalkyl or substituted alkyl or cycloalkyl radical, $x$ is an integer from 2 to 10 and $y$ is an integer from 1 to 10. The polyalkylene polyamines are preferred; they include diethylene triamine, triethylene tetramine, tetraethylene pentamine, pentaethylene hexamine, N-(3-aminopropyl) ethylene diamine, N-(4-aminobutyl) ethylene diamine, trimethylene diamine, tetramethylene diamine, pentamethylene diamine, hexamethylene diamine, di(trimethylene) triamine, N,N-dimethyl propylene diamine, and higher homologs thereof. Particularly useful are the polyethylene polyamines, especially a mixture of diethylene triamine and triethylene tetramine.

Reagent C is prepared by reacting certain aliphatic carboxylic acids or esters, hereinafter sometimes identified as component I, with one or more of a number of amino compounds which may be obtained in various ways but which are characterized by similar chemical structure. Component I is usually an aliphatic carboxylic acid having at least about 12 carbon atoms, preferably about 16–30 carbon atoms, or a mixture of such acids. Both saturated and unsaturated acids are suitable; examples are dodecanoic acid, palmitic acid, oleic acid, stearic acid, linoleic acid, linolenic acid, naphthenic acids, chlorostearic acid, dichlorostearic acid, and commercially available acids which are obtained by the hydrolysis of tall oil, sperm oil and the like. Acids having about 16–24 carbon atoms are especially preferred; illustrative of these are naphthenic acids having a molecular weight of 200–400, oleic acid, stearic acid and tall oil acid. Also useful as component I are the lower alkyl esters of said acids. The term "lower alkyl" as used herein denotes alkyl radicals containing up to 7 carbon atoms. Methyl esters are especially preferred.

One type of composition useful as reagent C is prepared by reacting component I with an alkylene polyamine and an aliphatic epoxide having about 2–4 carbon atoms, said combination of reagents being hereinafter referred to as component II. The alkylene polyamine is the same type of compound defined hereinabove with reference to reagent B. The amine used in component II may be identical to or different from the one used as reagent B.

Also used as part of component II is an aliphatic epoxide having about 2–4 carbon atoms. Examples of such epoxides are ethylene oxide, propylene oxide, the butylene oxides and epichlorohydrin. The amount of epoxide used is about 1–20%, preferably about 1–5%, of the combined weight of component I and the alkylene polyamine of component II.

In the preferred method for preparing reagent C, component I and the alkylene polyamine are first reacted at a temperature from about 100°C. up to the decomposition temperature of the mixture. (Temperatures above about 150°C. are preferred when compositions containing amidine or imidazoline linkages, as described hereinafter, are desired.) The presence of a solvent in the reaction mixture is often advantageous to facilitate mixing and temperature control. The solvent may be a hydrocarbon or other inert liquid such as benzene, toluene, xylene, naphtha n-hexane, cyclohexane, dodecane, octane, chlorobenzene, dichloroethane, dioxane, ether, chloroform, carbon tetrachloride, nitrobenzene or mineral oil.

While the molecular structure of reagent C is not known with certainty and is not critical for the purposes of this invention, it is known that component I reacts with the alkylene polyamine to form a partially acylated polyamine having amide or amidine linkages, including cyclic amidine linkages such as are found in imidazolines. Illustrative is the reaction of a carboxylic acid with diethylene triamine, represented by the following equations:

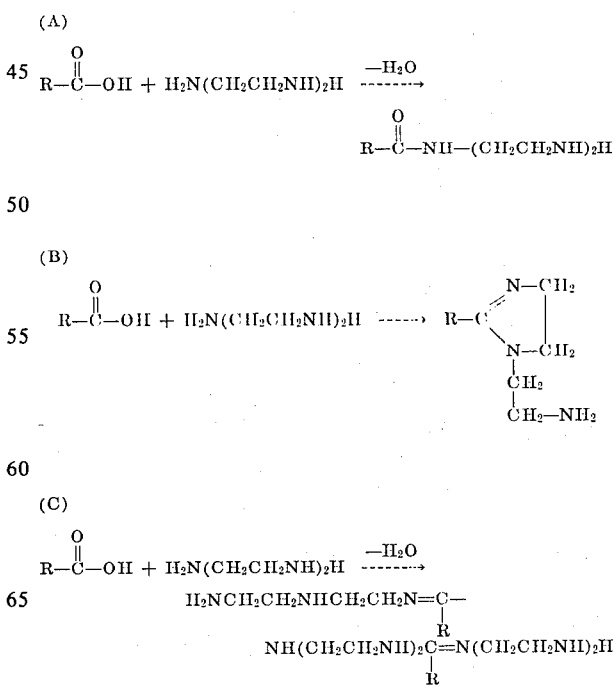

The relative proportions of component I and the alkylene polyamine depend upon the number of nitrogen atoms and other acid- or ester-reactive (e.g., hydroxy or mercapto) groups in the amine, the type of chemical bonds desired in reagent C, and the stoichiometry of formation of such linkages. Reagent C should contain at least one basic nitrogen atom. Thus, where an alkylene polyamine has n amino and other acid- or ester-reactive groups per molecule, the maximum amount of component I will be (n-1) equivalents for each mole of alkylene polyamine. Preferably, sufficient acid is used to convert about one-half of the total amino groups in the polyamine to non-basic moieties. This will require one equivalent of acid for each two equivalents of amine if amide, amidine or imidazoline linkages are formed. (It will be noted that in an amidine or imidazoline, one nitrogen atom is basic although both are acylated.) The equivalent weight of the acid is based upon the number of carboxylic acid radicals in the molecule and that of the polyamine is based upon the number of amino radicals in the molecule. To illustrate, a monocarboxylic acid has one equivalent per mole; ethylene diamine has two equivalents per mole; and tetraethylene pentamine has five equivalents per mole.

The reaction of the acid-amine product with the epoxide is usually carried out at about 120°–250°C., but higher temperatures, up to the decomposition point of the reaction mixture, may be used. The treatment is preferably effected by introducing small increments of the epoxide to the acid-amine product.

Although it is preferred to react component I first with the amine and then with the epoxide of component II, as described above, this order is not critical; it is also possible to form an amine-epoxide product first and subsequently react the same with component I. Because of the reactivity of acids with epoxides, it is not possible to add the epoxide to the acid first or to add a mixture of amine and epoxide to the acid.

Also useful for the preparation of reagent C are N-hydroxyalkyl-substituted alkylene polyamines such as N-2-hydroxyethyl ethylene diamine, the N-hydroxyethyl diethylene triamines, etc. It will be appreciated that the reaction products of these substances (hereinafter sometimes referred to as component III) with component I are quire similar in chemical structure to the compositions prepared from component I and component II. The temperatures and reactant ratios employed are similar when component III is used to when component II is used.

The following examples illustrate the preparation of compositions suitable for use as reagent C.

EXAMPLE 8

An alkylene amine mixture (565 parts) consisting of triethylene tetramine and diethylene triamine in weight ratio of 3:1 is added to a mixture of equivalent amounts of a naphthenic acid having an acid number of 180 (1,270 parts) and oleic acid (1,110 parts) at 20°–80°C. The total quantity of the two acids used is such as to provide one equivalent for each two equivalents of the amine mixture. The reaction is exothermic. The mixture is blown with nitrogen while it is being heated to 240°C. in 4.5 hours and thereafter is heated at this temperature for 2 hours. Water is collected as the distillate. To the residue, ethylene oxide (140 parts) is added at 170°–180°C. over a period of 2 hours while nitrogen is bubbled through. The reaction mixture then is blown with nitrogen for 15 minutes and diluted with 940 parts of xylene to a solution containing 25% of xylene. The resulting solution has a nitrogen content of 5.4% and a base number of 82 at pH of 4, the latter being indicative of free amino groups.

EXAMPLE 9

The alkylene amine mixture (565 parts) described in Example 8 is added to oleic acid (2,220 parts) at 20°–80°C. The quantity of acid used provides one equivalent for each two equivalents of the amine mixture. The reaction is exothermic. The mixture is blown with nitrogen while it is being heated to 240°C. in 4.5 hours and thereafter is heated at this temperature for 2 hours. Water is collected as the distillate. The residue has a nitrogen content of 8.56% and a base number of 122 at a pH of 4, the latter being indicative of free amino groups.

To 811 parts of the above residue 2 parts of potassium hydroxide is added, and then 147.5 parts of propylene oxide is introduced at 150°–165°C. over a period of 1.75 hours. The reaction mixture is held at 165°–170°C. for an additional 0.5 hour. The resulting product has a nitrogen content of 6.90%

EXAMPLE 10

To a solution of 734 parts of a naphthenic acid having an acid number of 237 and 867 parts of oleic acid in 281 parts of mineral oil is added, over 10 minutes, 468 parts of the amine mixture used in Example 8. An exothermic reaction occurs and the temperature rises to 80°C. The mixture is heated to 243°C. over 4-½ hours and it is then heated for 4 hours at 240°–245°C. During this time, 234 grams of mixed aqueous and organic distillate is collected.

The reaction mixture is cooled to 170°C., and 114 parts of ethylene oxide is added below the surface of the mixture at 170°–176°C., under nitrogen. The mass is then blown with nitrogen and cooled to 93°C., after which 764 parts of xylene are added to form a 75% solution in xylene. The product contains 5.58% nitrogen and has a base number (pH 4) of 96.5.

EXAMPLE 11

A mixture of 720 parts (3 equivalents) of the naphthenic acid used in Example 10 and 312 parts (6 equivalents) of N-2-hydroxyethyl ethylene diamine is stirred vigorously; an exothermic reaction occurs which causes the temperature to rise to 65°C. The mixture is heated at 220°C. under nitrogen for 5 hours, with water being removed from the mixture by distillation. The product contains 8.48% nitrogen and has a base number (pH 4) of 160.8.

The compositions of this invention are prepared by simply mixing the components at a temperature below about 100°C. The reaction in most instances is slightly exothermic. Preferably, it is carried out in the presence of a solvent, especially a nonpolar solvent such as benzene, naphtha, toluene, xylene, n-hexane, dioxane, chlorobenzene, kerosene or fuel oil.

As used with particular reference to reagent C, the terms "equivalent" and "equivalent of nitrogen" relate to the basic nitrogen only. Thus, the equivalent weight of reagent C is its molecular weight divided by the number of basic nitrogen atoms in the molecule.

In general, useful compositions are obtained according to the present invention when about 0.5–0.9 equivalent of reagent B and about 0.05–2.0 equivalents of reagent C are reacted with one equivalent of component A. The compositions must also contain a total of about 0.55–2.5 equivalents of basic nitrogen, which may in each individual instance be provided by either B or C, per equivalent of A (calculated on the basis of atoms of acidic hydrogen per molecule). The preferred compositions contain about 0.5–0.9 equivalent of B and a total of about 1.0–1.1 equivalents of nitrogen per equivalent of A. In a still more preferred embodiment, the composition contains about 0.85–0.9 equivalent of B and about 0.1–0.2 equivalent of C, with a total of 1.0–1.1 equivalents of nitrogen, per equivalent of A.

While the exact chemical structure of the compositions prepared as described above is not known, it is believed that they are predominantly phosphate salts of the amines used.

In the compounding of the additive compositions of this invention, it is frequently preferred to add other substances such as solvents, demulsifiers and the like.

The preparation of the additive compositions of this invention is illustrated by the following examples. As used in Examples 12, 13 and 16, the term "acylated, oxyalkylated amine" refers to a product prepared substantially as described in Example 8 and having a nitrogen content of 5.68% and a base number of 94.7 (pH 4).

EXAMPLE 12

To 263 parts (1.0 equivalent) of the product of Example 1 is added, over 5 minutes, 83 parts (0.14 equivalent) of acylated, oxyalkylated amine, at a temperature between room temperature and 38°C. The mixture is stirred for one-half hour, after which 123 parts of xylene and 32.8 parts (0.86 equivalent) of an approximately 3:1 (by weight) mixture of triethylene tetramine and diethylene triamine, respectively, are added. The latter is introduced at between room temperature and 40°C., after which the mixture is stirred for one-half hour and filtered. The product, a 71.3% solution in xylene, contains 4.60% phosphorus and 3.35% nitrogen. To this product is added 0.25% by weight of an oxyalkylated demulsifier.

EXAMPLE 13

Following the procedure of Example 12, a product is prepared from 1,315 parts (5 equivalents) of the product of Example 1, 414 parts (0.70 equivalent) of acylated, oxyalkylated amine, 170 parts (4.45 equivalents) of the triethylene tetraminediethylene triamine mixture and 610 parts of xylene. The product contains 4.45% phosphorus and 3.37% nitrogen. To it are added 1.6% of an oxyalkylated demulsifier and 1.0% of oxyalkylated glycerol.

EXAMPLE 14

To 1.0 equivalent the product of Example 1 is added, at a temperature below 40°C., 0.14 equivalent of the product of Example 8 and 129 parts of isopropyl alcohol. Then 0.89 equivalent of ethylene diamine is added, followed by sufficient xylene to form a 68.4% solution. The product is similar to that of Examples 12 and 13.

EXAMPLE 15

Following the procedure of Example 12, a product (71.1% solution in xylene) is prepared from 1.0 equivalent of the product of Example 2, 0.14 equivalent of the product of Example 9 and 0.89 equivalent of triethylene tetramine.

EXAMPLE 16

Following the procedure of Example 12, a product (72.1% solution in xylene) is prepared from 1.0 equivalent of the product of Example 1, 0.14 equivalent of acylated, oxyalkylated amine, and 0.89 equivalent of a mixture of polyethylene polyamines containing about 3–7 amino groups per molecule. The product has a nitrogen content of 3.51% and a phosphorus content of 4.51%.

EXAMPLE 17

Following the procedure of Example 12, a product (70% solution is xylene) is prepared from 1.0 equivalent of the product of Example 5, 0.11 equivalent of the product of Example 10 and 0.9 equivalent of triethylene tetramine.

EXAMPLE 18

To a solution of 129 parts (0.5 equivalent) of the product of Example 1 in 66 parts of xylene is added 16.4 parts (0.43 equivalent) of the polyethylene polyamine mixture of Example 12. An exothermic reaction occurs which caused the temperature to rise to about 50°C. Stirring is continued as 19.8 parts (0.07 equivalent) of the product of Example 11 is added. The temperature rises to 60°C. The product is the desired composition of this invention.

The following example, included for comparison, illustrates the preparation of an additive composition according to the above-mentioned U.S. Pat. No. 3,427,141.

EXAMPLE 19

To a solution of 328 parts (1.33 equivalents) of the product of Example 1 in 150 parts of isopropyl alcohol is added 52.5 parts (1.17 equivalents) of dimethylamine, which is introduced beneath the surface of the liquid at 23°–65°C. The reaction is exothermic and the mixture is cooled by means of a water bath during the addition. The reaction mixture is stirred for 1-½ hours at 65°C., after which time a blend of 116.4 parts (0.19 equivalent) of the product of Example 8 and 3.6 parts of an oxyalkylated demulsifier is added over 15 minutes at 65°C. To the mixture thus formed is added an additional 6.9 parts of the oxyalkylated demulsifier and 6.9 parts of oxyalkylated glycerol. The mixture is then cooled to 38°C. and filtered. The product contains 3.4% nitrogen and 4.3% phosphorus.

As previously stated, the compositions of this invention are useful as gasoline additives. The gasoline in which these compositions are used may be any hydrocarbon or mixture of hydrocarbons falling substantially within the boiling range of commercial gasoline, which is normally about 30°–440°F. Particularly preferred is a mixture of hydrocarbons having an ASTM boiling range of about 140°F. at 10% distillation to about 392°F. at 90% distillation and a Reid vapor pressure of between 11.5 and 15.0 pounds.

The compositions of this invention are soluble in gasoline and may be incorporated therein simply by mixing them with the gasoline at the desired concentration. Alternatively, they may be dissolved first in a combustible solvent, particularly a hydrocarbon solvent having a boiling point below about 250°C. such as naphtha, benzene, toluene, xylene, gasoline or light mineral oil to obtain a fluid concentrate, and the concentrate may then be diluted with gasoline to obtain the final fuel composition. In some instances, it is convenient to form the salt in the final fuel composition by adding the reagents A, B and C to the final fuel composition at suitable concentrations. The concentration of the salt in the final gasoline composition is usually about 0.0001–0.05 part by weight, preferably about 0.002–0.02 part, per 100 parts of fuel. Higher concentrations may be used but are ordinarily unnecessary.

In addition to the compositions of this invention, the gasoline may contain other additives which are known to those skilled in the art. These additives include antiknock agents such as tetraalkyl lead compounds; lead scavengers such as the haloalkanes; deposit preventers or modifiers such as the triaryl phosphates; dyes; antioxidants such as 2,6-di-tertiary-butyl-4-methylphenol; rust inhibitors such as alkylated succinic acids; dispersants such as the reaction products of polyalkylene polyamines with alkylated succinic acids; bacteriostatic agents; gum inhibitors; metal deactivators; upper cylinder lubricants; and the like.

The effectiveness of the compositions of this invention to prevent engine stalling due to carburetor throttle plate ice formation is shown by a carburetor icing test performed in the laboratory using a 6-cylinder Chevrolet engine. In this test, air at 46°–49°F. and 100% relative humidity is supplied by an air-conditioning and humidifying system to a Stromberg DXOV-2 single barrel carburetor mounted on an 18-inch vertical extension of the intake manifold of a 216 cubic inch 6-cylinder Chevrolet engine. A clear plastic spacer is inserted between the carburetor and the throttle body to permit the observation of ice formation during this test.

In preparation for the test, the engine is supplied with fresh oil and new or cleaned spark plugs, the fuel system is purged, the throttle plate is washed with xylene, the timing of the engine is set at 5° BTC at 500 r.p.m. and the throttle stops are adjusted for the engine to idle at 500 r.p.m. and run at 1,750 r.p.m.

During the test the following temperatures are maintained: intake air dry bulb and wet bulb temperature at 46°–49°F.; carburetor throttle bore at 28°F. ± 1°F.; carburetor throttle bore at 28°F. ± 1°F.

The test procedure is as follows:
1. The engine is run at 1,750 r.p.m. until the throttle plate temperature drops to 30°F.
2. The engine is stopped until the throttle plate warms to 40°F.
3. The engine and a stop watch are started simultaneously, and the engine is run at 1,750 r.p.m. until it appears that enough ice is built up to cause the engine to stall.
4. The carburetor heater is turned off and the engine is run for 20 seconds more at 1,750 r.p.m. and then returned to idle at 500 r.p.m. for 10 seconds.
5. If a stall occurs, steps 1 through 4 are repeated reducing the running time at 1,750 r.p.m. by ¼ minute increments until the engine will continue to run for 10 seconds at idle. If no stall occurs, steps 1 to 4 are repeated increasing the running time at 1,750 r.p.m. by ¼ minute increments until a stall occurs during the idle time of 10 seconds. If no stall occurs in 6 minutes of running time, the fuel is given a rating of 6 plus.

The engine is calibrated before testing with the base fuel and the base fuel plus 1% by volume (1.09% by weight) isopropyl alcohol. The engine is adjusted to stall with the base fuel after 1-½ ± ¼ minutes of running at 1,750 r.p.m. and to run between 5 and 6 minutes at 1,750 r.p.m. before stalling using the base fuel plus 1% isopropyl alcohol.

The results of this test are given in Table I.

TABLE I

| Additive | Time, min. |
|---|---|
| None | 1.12 |
| Isopropyl alcohol (1.09%) | 5.75 |
| Product of Example 19 (known additive): | |
| 0.006% (0.0044% active ingredient) | 4.81 |
| 0.004% (0.0029% active ingredient) | 4.12 |
| Product of Example 13: | |
| 0.006% (0.0042% active ingredient) | 5.12 |
| 0.004% (0.0028% active ingredient) | 4.75 |
| Product of Example 18: | |
| 0.006% (0.0043% active ingredient) | 3.88* |
| 0.004% (0.0029% active ingredient) | 3.75** |

\* Average of four readings.
\*\*Average of five readings.

The effect of the additives of this invention on water susceptibility is shown by an extremely severe test in which 100 ml. of gasoline containing the additive is shaken by hand for 15 seconds with 9.5 ml. of water in a 6-oz. bottle. The layers are allowed to separate for 1 minute and the shaking cycle is repeated a number of times. When tested by this method, gasoline containing 0.06% (0.042% active ingredient) of the product of Example 13 gave a complete break between fuel and water after 54 shaking cycles and 24 hours of standing. By contrast, gasoline containing 0.06% (0.044% active ingredient) of the product of Example 19 was completely emulsified after the same number of cycles.

The effectiveness of the compositions of this invention as detergents for the prevention of deposits in the carburetor throttle area is shown by the Dodge-Falcon Carburetor Deposit Test. In this test, two Falcon carburetors are mounted on a specifal wye manifold leading to the normal two-barrel manifold. Each carburetor has a removable aluminum sleeve insert and independent fuel system. The engine used is a 1956 Dodge V-8.

Prior to the test, the carburetor sleeves, throttle plates and throat area are thoroughly cleaned and the idle throttle stop clearances of both carburetors are set equally. New or cleaned spark plugs are installed and the engine is charged with 5 quarts of oil. The engine is started with the fuels being tested and the head temperature is brought to 180°F. The spark timing is set at 6° BDTC, 500 r.p.m., with the blowby gases being directed into the atmosphere. The test consists of two 20-hour runs during which the engine is idled at 650 r.p.m. for 8 minutes while the crankcase blowby gas is directed to the carburetor in order to form deposits, after which the engine is idled for ½ minute at 2,000 r.p.m. to allow the fuel to wash the deposits away.

After the completion of the test, the deposits formed in each barrel are weighed and removed. The fuels are reversed and the procedure repeated. Table II contains results for two consecutive tests in which gasolines containing 0.006% of a composition of this invention (Example 13) was tested against one containing 0.006% of the previously known additive (Example 19).

TABLE II

| Additive | Deposit weight, mg. |
|---|---|
| Product of Example 13 | 4.6, 2.0, 5.0, 3.7 (total 15.3) |
| Product of Example 19 | 4.8, 4.0, 4.8, 3.5 (total 17.1) |

In an identical test, the product of Example 18 gave a total rating of 13.9 as compared with 27.7 for a control sample not containing the composition of this invention.

What is claimed is:

1. A method for the preparation of a composition of matter which comprises reacting, at a temperature below about 100°C., A. at least one compound having the formula $$\begin{matrix} R^1O \\ \phantom{R^1O}\diagdown \\ \phantom{R^1O}\phantom{\diagdown}POOH, \\ \phantom{R^1O}\diagup \\ R^2O \end{matrix}$$

wherein $R^1$ is an alkyl radical having 8–18 carbon atoms and $R^2$ is hydrogen or an alkyl radical having 8–18 carbon atoms;

B. about 0.5–0.9 equivalent, per equivalent of reagent A, of at least one polyalkylene polyamine having 2–11 amino groups; and C. about 0.5–2.0 equivalents, per equivalent of reagent A, of the reaction product of (I) at least one aliphatic carboxylic acid having about 16–30 carbon atoms, or a lower alkyl ester thereof, with (II) at least one alkylene polyamine having 2–11 amino groups and an alkylene oxide having about 2–4 carbon atoms, the amount of said alkylene oxide being about 1–20% by weight of the combination of said carboxylic acid or ester and said alkylene polyamine, or with (III) at least one N-hydroxyalkyl-substituted alkylene polyamine having 2–11 amino groups;

about 0.55–2.5 equivalents of basic nitrogen being present in reagents B and C per equivalent of reagent A.

2. A method according to claim 1 wherein reagent A is a mixture of compounds of the formula $$(RO)_2POOH \text{ and } ROPO(OH)_2$$

wherein R is an alkyl radical.

3. A method according to claim 2 wherein the reaction mixture contains about 0.5–0.9 equivalent of reagent B and a total of about 1.0–1.1 equivalents of nitrogen per equivalent of reagent A.

4. A method according to claim 3 wherein the reaction mixture contains about 0.85–0.90 equivalent of reagent B and about 0.1–0.2 equivalent of C per equivalent of reagent A.

5. A method according to claim 4 wherein reagent C is prepared from at least one aliphatic monocarboxylic acid having about 16–30 carbon atoms, at least one polyethylene polyamine and ethylene or propylene oxide.

6. A method according to claim 5 wherein reagent B is at least one polyethylene polyamine.

7. A method according to claim 6 where R is a primary alkyl radical having about 8–18 carbon atoms; reagent B is a mixture of diethylene triamine and triethylene tetramine; and reagent C is a composition which contains at least one basic nitrogen atom and which is formed by reacting (I) a mixture of aliphatic monocarboxylic acids having about 16–30 carbon atoms with (II) a mixture of diethylene triamine and triethylene tetramine and about 1–5%, by weight of the reaction product of said acid and amine mixtures, of ethylene oxide.

8. A method according to claim 4 wherein reagent C is prepared from at least one aliphatic monocarboxylic acid having about 16–30 carbon atoms and at least one N-hydroxyalkyl-substituted alkylene polyamine.

9. A method according to claim 8 wherein the N-hydroxyalkyl-substituted alkylene polyamine is N-2-hydroxyethyl ethylene diamine.

10. A method according to claim 9 wherein reagent B is at least one polyethylene polyamine.

11. A method according to claim 10 wherein reagent A is a mixture of compounds of the formulas $(RO)_2POOH$ and $ROPO(OH)_2$ and R is a primary alkyl radical having about 8–18 carbon atoms, and reagent B is a mixture of diethylene triamine and triethylene tetramine.

12. A composition prepared by the method of claim 1.

13. A composition prepared by the method of claim 3.

14. A composition prepared by the method of claim 6.

15. A composition prepared by the method of claim 7.

16. A composition prepared by the method of claim 8.

17. A composition prepared by the method of claim 11.

* * * * *

UNITED STATES PATENT OFFICE
CERTIFICATE OF CORRECTION

Patent No. 3,859,300          Dated January 7, 1975

Inventor(s) Clark Ober Miller

It is certified that error appears in the above-identified patent and that said Letters Patent are hereby corrected as shown below:

Column 13, line 38, "0.5" should read --0.05--.
Column 14, line 17 (first line of claim 7), "where" should read --wherein--.

Signed and sealed this 22nd day of April 1975.

(SEAL)
Attest:

RUTH C. MASON
Attesting Officer

C. MARSHALL DANN
Commissioner of Patents
and Trademarks